US012345188B2

(12) United States Patent
Sheth et al.

(10) Patent No.: US 12,345,188 B2
(45) Date of Patent: Jul. 1, 2025

(54) EXHAUST STRUCTURE HAVING RIB

(71) Applicant: Caterpillar Inc., Peoria, IL (US)

(72) Inventors: Vikas Sheth, Edwards, IL (US); Nataraj Srinivasan, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/602,548

(22) Filed: Mar. 12, 2024

(65) Prior Publication Data

US 2024/0309793 A1 Sep. 19, 2024

Related U.S. Application Data

(60) Provisional application No. 63/489,825, filed on Mar. 13, 2023.

(51) Int. Cl.

| | |
|---|---|
| ***F01N 13/10*** | (2010.01) |
| ***F02B 37/02*** | (2006.01) |
| ***F02B 39/00*** | (2006.01) |

(52) U.S. Cl.

CPC .............. *F01N 13/10* (2013.01); *F02B 37/02* (2013.01); *F02B 39/00* (2013.01); *F01N 2260/10* (2013.01); *F01N 2260/18* (2013.01); *F01N 2340/00* (2013.01)

(58) Field of Classification Search

CPC .......... F01N 3/046; F01N 13/08; F01N 13/10; F01N 13/18; F01N 13/1805; F01N 2260/10; F01N 2260/18; F01N 2340/00; F01N 2340/02; F01N 2340/04; F01N 2340/06; F02B 37/02; F02B 39/00

See application file for complete search history.

(56) References Cited

U.S. PATENT DOCUMENTS 6,256,990 B1 7/2001 Itoh
9,816,428 B2 * 11/2017 Callahan ............... F01N 13/102

FOREIGN PATENT DOCUMENTS

| | | | | |
|---|---|---|---|---|
| CN | 201858018 U | 6/2011 | | |
| CN | 203655401 U | 6/2014 | | |
| CN | 110905646 A | 3/2020 | | |
| CN | 211777680 U | 10/2020 | | |
| CN | 112576356 B | 6/2021 | | |
| DE | 102008021281 A1 * | 11/2009 | ............ | F01N 13/08 |
| JP | 2007177690 A | 7/2007 | | |
| JP | 4540111 B2 | 9/2010 | | |

* cited by examiner

*Primary Examiner* — Loren C Edwards
(74) *Attorney, Agent, or Firm* — Bookoff McAndrews, PLLC

(57) ABSTRACT

An exhaust structure for an exhaust manifold includes a body including a first inlet section configured to receive exhaust gas, a second inlet section configured to receive exhaust gas, and an outlet section disposed in fluid communication with each of the first inlet section and the second inlet section to receive exhaust gas, wherein exhaust gas from the first inlet section and the second inlet section exit the exhaust structure through the outlet section, and wherein the outlet section includes a flange. The body may include a rib extending generally along the longitudinal axis and disposed on a surface of the outlet section, the rib including a first section having a first inclined surface, a second section spaced from the first section and having a second inclined surface, and a third section disposed between the first section and the second section, the third section having a curved surface.

20 Claims, 7 Drawing Sheets

EXHAUST STRUCTURE HAVING RIB

CROSS-REFERENCE TO RELATED APPLICATION

This application claims the benefit of priority to U.S. Provisional Patent Application No. 63/489,825, filed on Mar. 13, 2023, the entirety of which is incorporated herein by reference.

TECHNICAL FIELD

The present disclosure relates to an exhaust structure for an exhaust manifold associated with an engine.

BACKGROUND

Some engine systems include an engine and a turbocharger that provides a desired power boost to the engine. Exhaust manifolds for these systems provide fluid communication between the engine and the turbocharger, guiding exhaust to a turbine of the turbocharger.

Some exhaust manifolds include a central portion to which the turbocharger is secured. During operation of the engine system, the central portion is subjected to significant amounts of thermal and vibrational stresses, partly due to the mass of the turbocharger acting on the central portion. For example, when the engine system is operating, vibrations from the turbocharger and the weight of the turbocharger may place significant forces on the central portion in the downward direction. These forces may reduce durability of the central portion of the exhaust manifold and, in some cases, may eventually lead to damage or even failure. Early failure or damage to the central portion may reduce the life of the exhaust manifold itself.

Chinese Utility Model CN211777680U to Li et al. ("the '680 patent") describes an engine exhaust manifold. The '680 patent relates to engine parts, including an exhaust pipe having an exhaust pipe body. A first air inlet is formed in one end of the exhaust pipe body, a second air inlet is formed in the other end of the exhaust pipe body, a third air inlet is formed in the middle of the exhaust pipe body, a flange is arranged at the third air inlet, a first reinforcing rib is arranged on one side of the first air inlet in the exhaust pipe body, a second reinforcing rib is arranged on one side of the second air inlet in the exhaust pipe body, and arc-shaped reinforcing ribs are arranged between the first air inlet and the flange and between the second air inlet and the flange respectively. While the exhaust manifold in the '680 patent may help reinforce some areas of the exhaust manifold, it does not include, for example, structure that facilitates conversion of vertical forces to tensional forces.

The devices and methods of this disclosure may address or solve one or more of the problems set forth above and/or other problems in the art. The scope of the current disclosure, however, is defined by the attached claims, and not by the ability to solve any specific problem.

SUMMARY OF THE DISCLOSURE

In one aspect, an exhaust structure for an exhaust manifold associated with an engine, the exhaust manifold extending along a longitudinal axis, may include a body including a first inlet section of the exhaust structure, wherein the first inlet section is configured to be in fluid communication with a first set of cylinders of the engine to receive exhaust gas therefrom, a second inlet section of the exhaust structure, wherein the second inlet section is configured to be in fluid communication with a second set of cylinders of the engine to receive exhaust gas therefrom, and an outlet section disposed in fluid communication with each of the first inlet section and the second inlet section to receive exhaust gas, wherein exhaust gas from the first inlet section and the second inlet section exit the exhaust structure through the outlet section, and wherein the outlet section includes a flange. The body may include a rib extending generally along the longitudinal axis and disposed on a surface of the outlet section, the rib including a first section having a first inclined surface, a second section spaced from the first section and having a second inclined surface, and a third section disposed between the first section and the second section, the third section having a curved surface.

In another aspect, an exhaust manifold associated with an engine and extending along a longitudinal axis may include an exhaust structure including a body, the body including a first inlet section configured to be in fluid communication with a first set of cylinders of the engine to receive exhaust gas therefrom, a second inlet section configured to be in fluid communication with a second set of cylinders of the engine to receive exhaust gas therefrom, an outlet section disposed between the first inlet section and the second inlet section, a flange in the outlet section and a rib. The rib may be disposed on an outer surface of the outlet section and may include a first inclined surface, a second inclined surface, and a curved surface extending between the first inclined surface and the second inclined surface. The exhaust manifold may also include a first manifold portion extending along the longitudinal axis and arranged to receive exhaust gas from at least one cylinder of the first set of cylinders and a second manifold portion extending along the longitudinal axis and arranged to receive exhaust gas from at least one cylinder of the second set of cylinders.

In yet another aspect, an engine system may include an engine having a first set of cylinders and a second set of cylinders and an exhaust manifold in fluid communication with the engine, the exhaust manifold extending along a longitudinal axis and including an exhaust structure. The exhaust structure may include a body including a first inlet section arranged at a first end of the exhaust structure, wherein the first inlet section is in fluid communication with the first set of cylinders of the engine to receive exhaust gas therefrom, a second inlet section arranged at a second, opposite end of the exhaust structure, wherein the second inlet section is in fluid communication with the second set of cylinders of the engine to receive exhaust gas therefrom, an outlet section disposed in fluid communication with each of the first inlet section and the second inlet section to receive exhaust gas, wherein exhaust gas from both the first inlet section and the second inlet section exit the exhaust structure through the outlet section, and wherein the outlet section includes a flange, and a rib extending along the longitudinal axis and disposed on a surface of the outlet section the flange of the outlet section. The rib may include a first section having a first inclined surface, a second section spaced from the first section and having a second inclined surface, and a third section disposed between the first section and the second section, the third section having a curved surface. The exhaust manifold may also include a first manifold portion extending along the longitudinal axis and arranged to receive exhaust gas from at least one cylinder of the first set of cylinders and a second manifold portion extending along the longitudinal axis and arranged to receive exhaust gas from at least one cylinder of the second set of cylinders. The engine system may also include a turbocharger disposed in fluid communication with the exhaust structure, wherein the turbocharger is secured to the exhaust structure at the flange of the outlet section.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
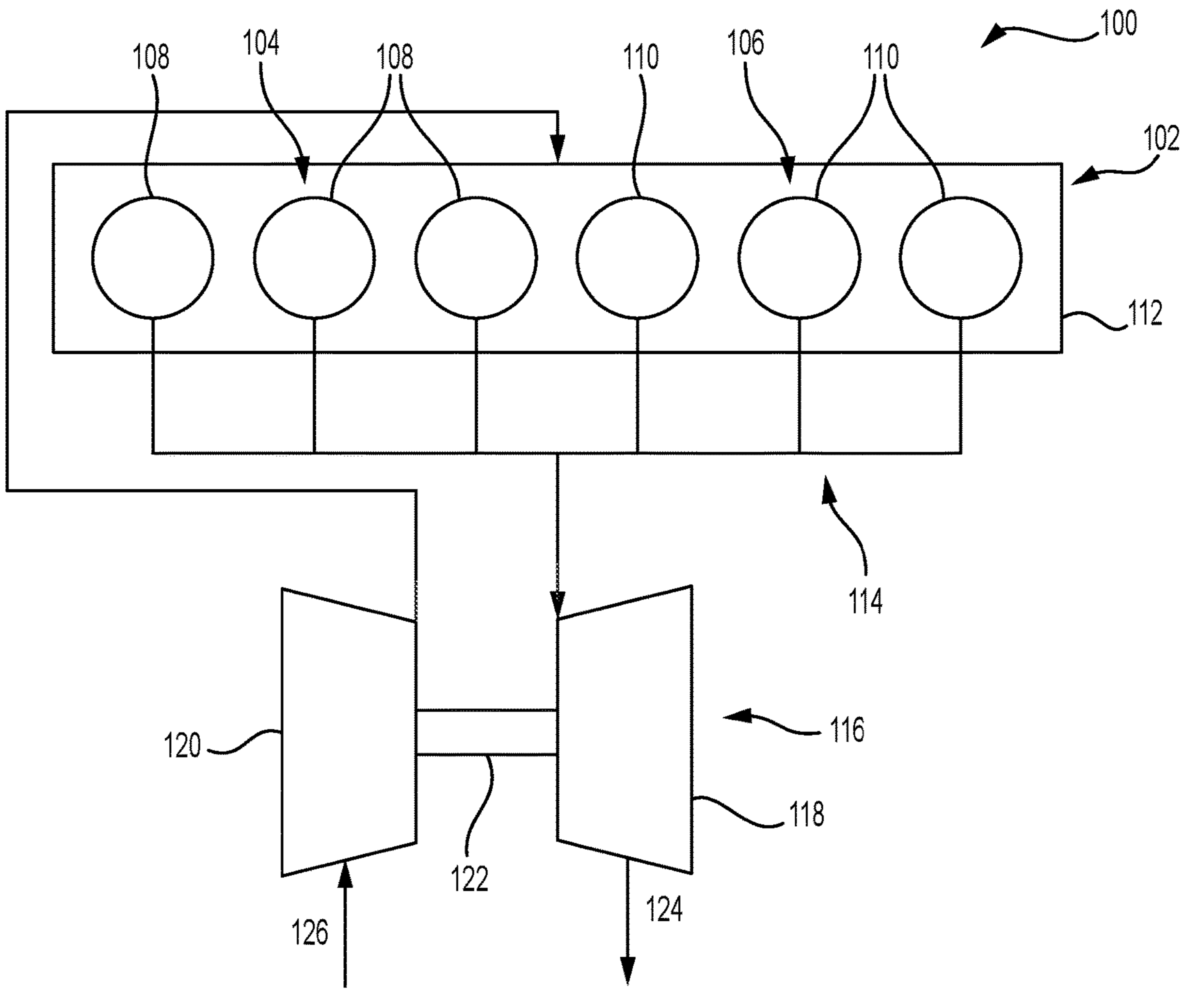
FIG. 1 is a schematic illustration of an engine system, in accordance with the concepts of the present disclosure.

FIG. 1 illustrates an exemplary engine system 100. The engine system 100 may be associated with power generation systems, motor vehicles, such as utility vehicles, or work machines, without any limitations thereto. The engine system 100 includes an engine 102. For the purposes of this disclosure, the engine 102 will be described as a four-stroke, compression ignition engine. One skilled in the art will recognize, however, that the engine 102 may be any other type of engine. The engine 102 may be fueled by any desired fuel, for example, diesel fuel and/or gaseous fuel.

The engine 102 includes a first set of cylinders 104 and a second set of cylinders 106. As used herein, a "set" of cylinders includes one or more cylinders. In the illustrated example, the first set of cylinders 104 includes three cylinders 108 and the second set of cylinders 106 includes three cylinders 110. The first and second set of cylinders 104, 106 may include any number of cylinders 108, 110, respectively, for a total of eight cylinders, ten cylinders, twelve cylinders, twenty cylinders, or more. As illustrated in FIG. 1, the engine 102 includes an engine block 112 that defines the first and second set of cylinders 104, 106.

A piston (not shown) may be slidably disposed within each cylinder 108, 110 to reciprocate between a top-dead-center (TDC) position and a bottom-dead-center (BDC) position. Further, a cylinder head (not shown) may be associated with each cylinder 108, 110. Each cylinder 108, 110, a corresponding piston, and a corresponding cylinder head may together define a combustion chamber (not shown). It is contemplated that the engine 102 may include any number of combustion chambers, and the combustion chambers may be disposed in an "in-line" configuration, a "V" configuration, or in any other suitable configuration.

In an example where the engine 102 is a four-stroke engine, each piston may reciprocate between the TDC and BDC positions through an intake stroke, a compression stroke, a combustion or power stroke, and an exhaust stroke. During the exhaust stroke, exhaust gas may be expelled out of the respective combustion chambers towards an exhaust manifold 114. All six cylinders 108, 110 may fire at different intervals and exhaust gas may be expelled in pulses. Alternatively, the engine 102 may be a two-stroke engine, where a complete cycle includes a compression/exhaust stroke (BDC to TDC) and a power/exhaust/intake stroke (TDC to BDC).

Further, the engine system 100 includes the exhaust manifold 114 in fluid communication with the engine 102. The exhaust manifold 114 receives exhaust gas from the combustion chambers of the cylinders 108, 110. The exhaust manifold 114 directs exhaust gas towards a turbocharger 116.

As illustrated in FIG. 1, the engine system 100 includes the turbocharger 116. The turbocharger 116 is disposed downstream of the engine 102. The turbocharger 116 includes a turbine 118 and a compressor 120, which are operatively coupled to each other through a shaft 122. Exhaust gas from the combustion chambers are directed into the turbine 118, which in turn directs exhaust gas toward the atmosphere via a line 124. Further, the compressor 120 receives fresh air from the atmosphere via a line 126. The turbocharger 116 transfers energy from an exhaust stream of the turbine 118 to an intake stream of the compressor 120, via the shaft 122. Further, the compressor 120 compresses air which is then introduced into the combustion chambers of the cylinders 108, 110 to obtain a pressure boost.

In some examples, the engine system 100 includes an exhaust/aftertreatment module (not shown) that treats exhaust gas exiting the turbine 118 in order to reduce/remove unwanted gaseous emissions or pollutants, such as nitrogen oxides, particulate matter (such as soot), sulfur oxides, carbon monoxide, unburnt hydrocarbons, and/or other organic compounds from exhaust gas.

Figure 2:
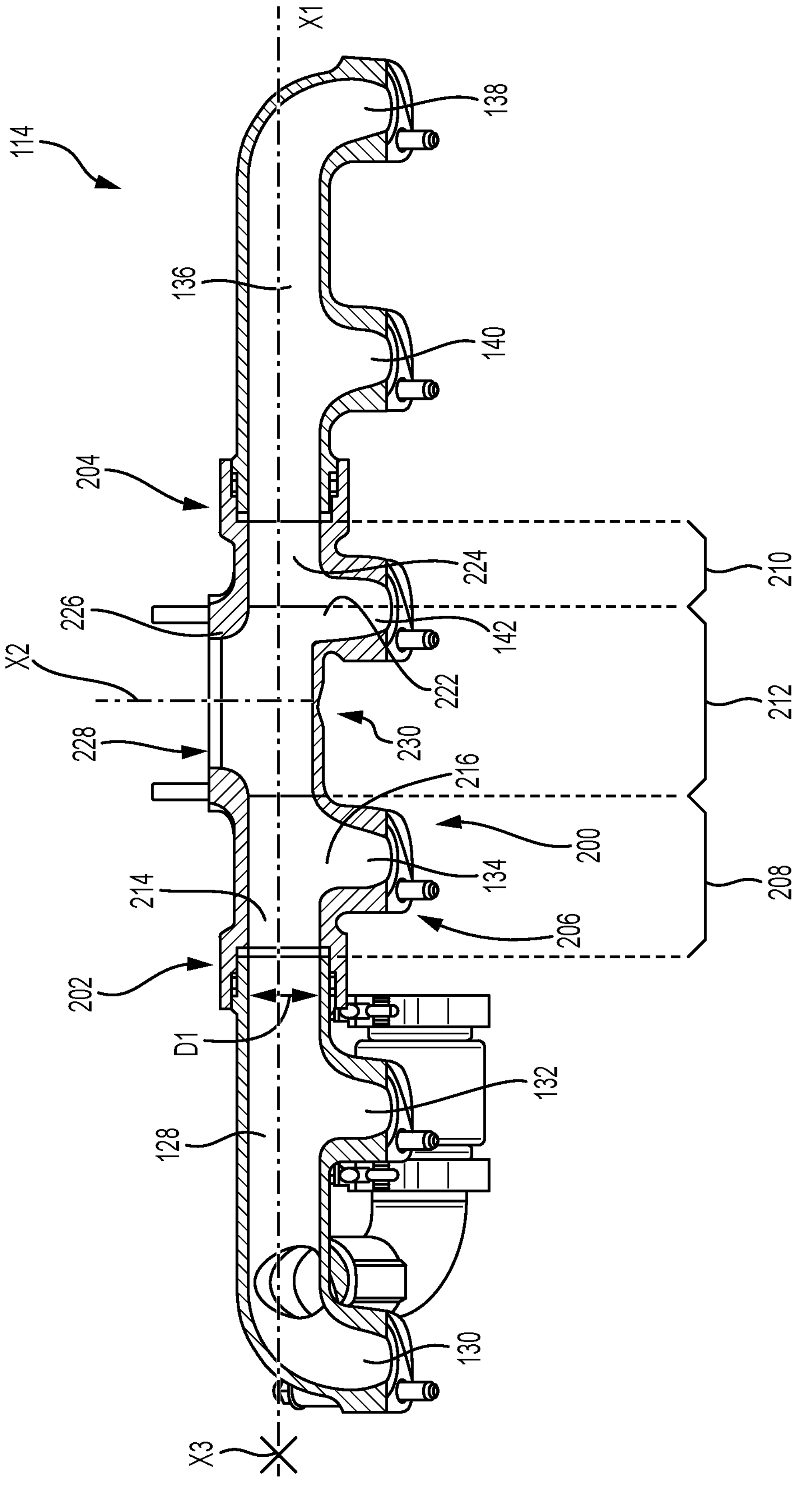
FIG. 2 is a cross-sectional view of an exemplary exhaust structure of the engine system of FIG. 1, in accordance with aspects of the present disclosure.

Referring now to FIG. 2, the exhaust manifold 114 extends along a longitudinal axis X1 and defines a standard diameter D1. The exhaust manifold 114 also extends along a vertical axis X2 and a lateral axis X3. The exhaust manifold 114 includes a first manifold portion 128 extending along the longitudinal axis X1. The first manifold portion 128 is arranged to receive exhaust gas from one or more cylinders 108 (FIG. 1) of the first set of cylinders 104 (FIG. 1). The exhaust manifold 114 further includes a number of first branched portions 130, 132, 134 configured as inlet ports or passages into the exhaust manifold. The first branched portions 130, 132, 134 are in fluid communication with combustion chambers of the corresponding cylinders 108 to receive exhaust gas therefrom. Further, the first branched portions 130, 132 may be integral (e.g., integrally formed or monolithically formed) with the first manifold portion 128 and extend angularly from the first manifold portion 128.

As shown in FIG. 2, the exhaust manifold 114 includes a second manifold portion 136 extending along the longitudinal axis X1. The second manifold portion 136 is arranged to receive exhaust gas from one or more cylinders 110 (FIG. 1) of the second set of cylinders 106 (FIG. 1). The exhaust manifold 114 further includes a number of second branched portions 138, 140, 142 configured as inlet ports or passages into the exhaust manifold. The second branched portions 138, 140, 142 are in fluid communication with combustion chambers of the corresponding cylinders 110 to receive exhaust gas therefrom. Further, the second branched portions 138, 140 may be integral (e.g., integrally formed or monolithically formed) with the second manifold portion 136 and extend angularly from the second manifold portion 136. The exemplary exhaust manifold 114 shown in FIG. 2 is configured for a six cylinder in-line engine by the inclusion of the three first branched portions 130, 132, 134 and the three second branched portions 138, 140, 142.

An exhaust structure 200 may form part or an entirety of the exhaust manifold 114 associated with the engine 102 (FIG. 1). The exhaust structure 200 defines a first end 202 and a second end 204 opposite the first end. The exhaust structure 200 is disposed between the first manifold portion 128 and the second manifold portion 136. The first manifold portion 128 is secured to the exhaust structure 200 at the first end 202 of the exhaust structure 200. Further, the second manifold portion 136 is secured to the exhaust structure 200 at the second end 204 of the exhaust structure 200.

Figure 3:
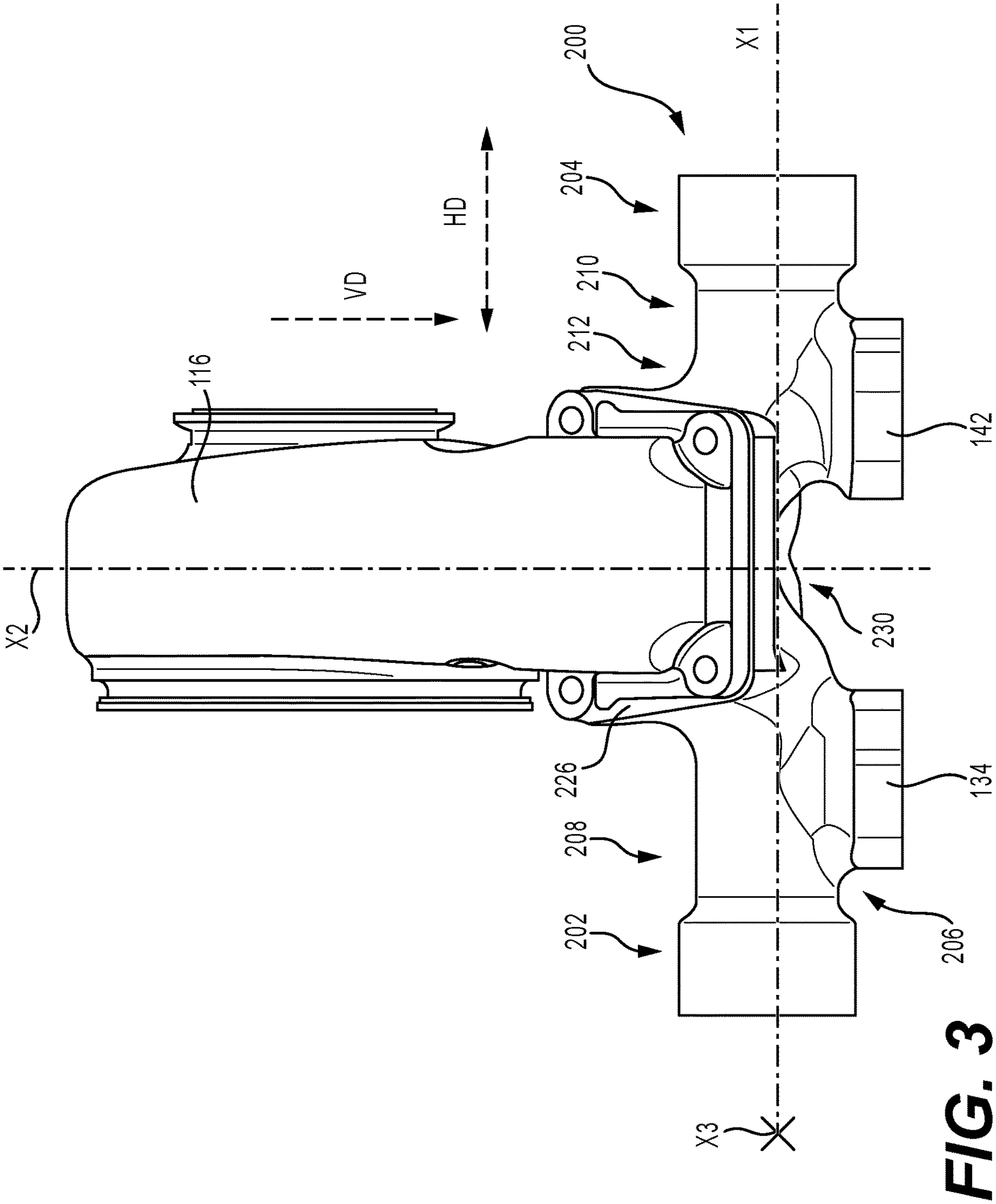
FIG. 3 is a perspective view of the exhaust structure of FIG. 2 and a turbocharger of the engine system of FIG. 1.

As shown in FIG. 3, the exhaust structure 200 is arranged to removably connect or secure the exhaust manifold 114 with the turbocharger 116, the exhaust structure 200 supporting at least part of the weight of the turbocharger 116. Further, the turbocharger 116 is disposed in fluid communication with the exhaust structure 200. The exhaust structure 200 includes a body 206. The turbocharger 116 may exert weight and/or vibrational forces on the exhaust structure 200 along a vertically downward direction VD.

Figure 4:
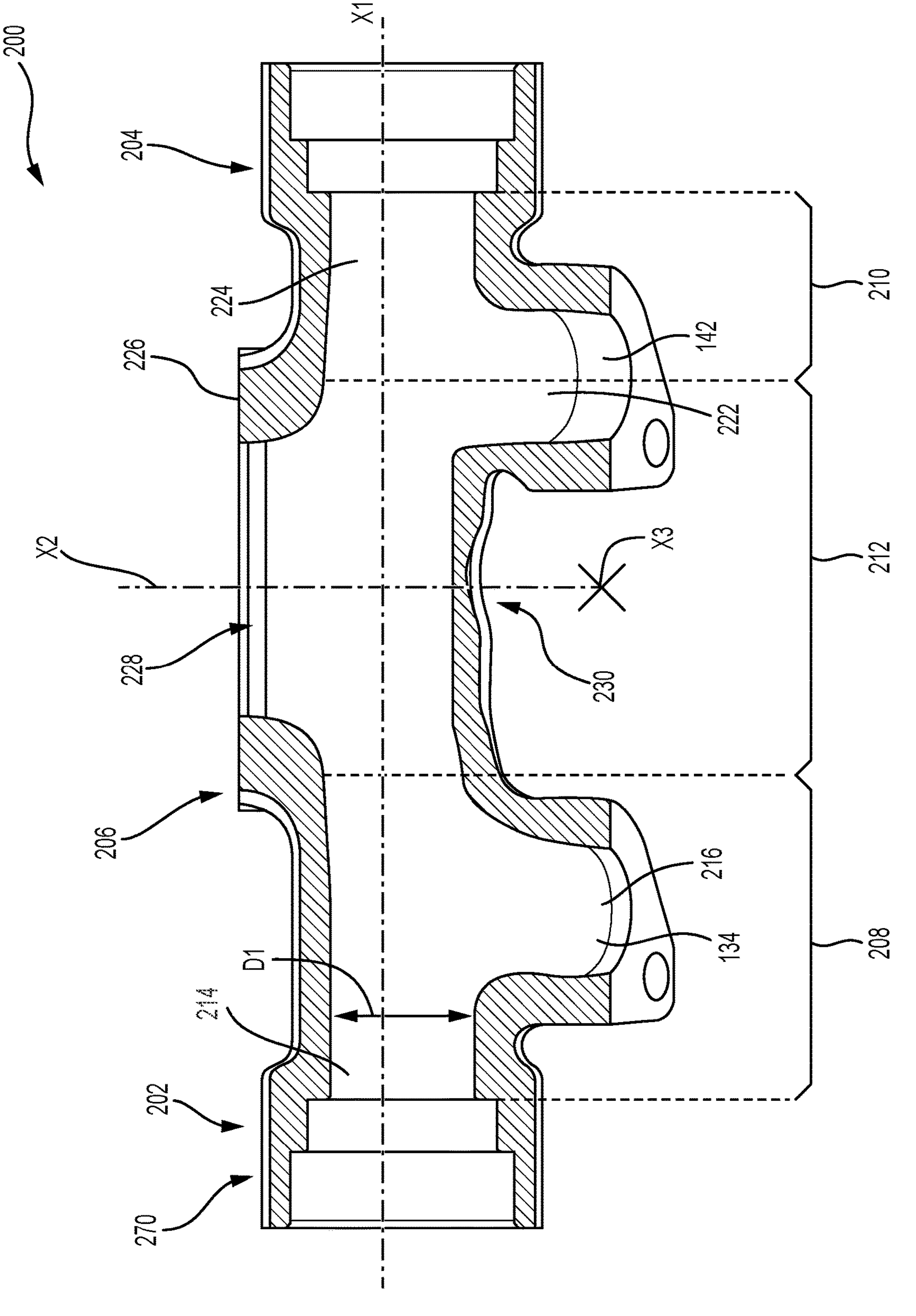
FIG. 4 is a cross-sectional view of the exhaust structure of FIG. 2.

FIG. 4 illustrates a cross-sectional view of the exhaust structure 200. As shown in FIG. 4, the body 206 includes a first inlet section 208, a second inlet section 210, and an outlet section 212 disposed between the first and second inlet sections 208, 210. The first inlet section 208 is integrally formed with and is in fluid communication with the outlet section 212. Further, the second inlet section 210 is integrally formed with and is in fluid communication with the outlet section 212. As depicted, the exhaust structure 200 is a one-piece member that may be monolithically formed as a single piece by casting, sintering, additive manufacturing (e.g., 3D printing), or any other desired process. The body 206 includes the first inlet section 208 arranged at the first end 202 of the exhaust structure 200. The first inlet section 208 is in fluid communication with the first set of cylinders 104 (see FIG. 1) to receive exhaust gas therefrom. The first inlet section 208 defines a first flow passage 214 that receives exhaust gas and directs it towards the outlet section 212.

With reference to FIG. 2, the exhaust structure 200 defines the first inlet flow passage 214 such that passage 214 extends along the longitudinal axis X1 of the exhaust structure 200. The exhaust structure 200 further defines a first exhaust inlet port 216 disposed at an angle to the longitudinal axis X1. The first inlet section 208 is arranged to receive exhaust gas via each of the first exhaust inlet port 216 and the first inlet flow passage 214. The first inlet flow passage 214 is in fluid communication with the first manifold portion 128. The first exhaust inlet port 216 fluidly connects the first inlet section 208 with one of the cylinders 104 of engine 100. In the example shown in FIG. 4, the first branched portion 134 is integral with the exhaust structure 200. Thus, the first inlet section 208 receives exhaust gas from each first branched portion 130, 132, 134 (FIG. 2).

The body 206 includes the second inlet section 210 arranged at the second, opposite end 204 of the exhaust structure 200. The second inlet section 210 is in fluid communication with the second set of cylinders 106 (FIG. 1) to receive exhaust gas therefrom. The second inlet section 210 defines a second flow passage 224 that receives exhaust gas and directs the exhaust towards the outlet section 212.

In some embodiments, a portion of the first manifold portion 128, a portion of the first inlet section 208, a portion of the second inlet section 210, and a portion of the second manifold portion 136 each have the same diameter, e.g., diameter D1, which may be considered a standard diameter. The term "standard diameter" as used in this disclosure refers to a diameter that is common (e.g., equivalent or approximately equivalent) across at least a portion of two or more of: a flow passage of the first manifold portion 128, the first inlet flow passage 214, the second inlet flow passage 224, or a flow passage of the second manifold portion 136. The standard diameter is measured between a pair of inlets (in the example of FIG. 2, measured between branched portions). The use of the term "diameter" does not require a circular cross section and may instead correspond to the greatest width of a non-circular cross-sectional area through which exhaust flows through the first manifold portion 128, the first inlet flow passage 214, the second inlet flow passage 224, or the second manifold portion 136.

The exhaust structure 200 defines the second inlet flow passage 224, which extends along the longitudinal axis X1. The exhaust structure 200 further defines a second exhaust inlet passage or exhaust inlet port 222 disposed at an angle to the longitudinal axis X1. The second inlet section 210 is arranged to receive exhaust gas via each of the second exhaust inlet port 222 and the second inlet flow passage 224. The second inlet flow passage 224 is in fluid communication with the second manifold portion 136. The second exhaust inlet port 222 fluidly connects the second inlet section 210 with one of the cylinders 106 of the engine 100. In the illustrated example of FIG. 4, the second branched portion 142 is integral with the exhaust structure 200. Thus, the second inlet section 210 receives exhaust gas from each second branched portion 138, 140, 142 (see FIG. 2).

Figure 5:
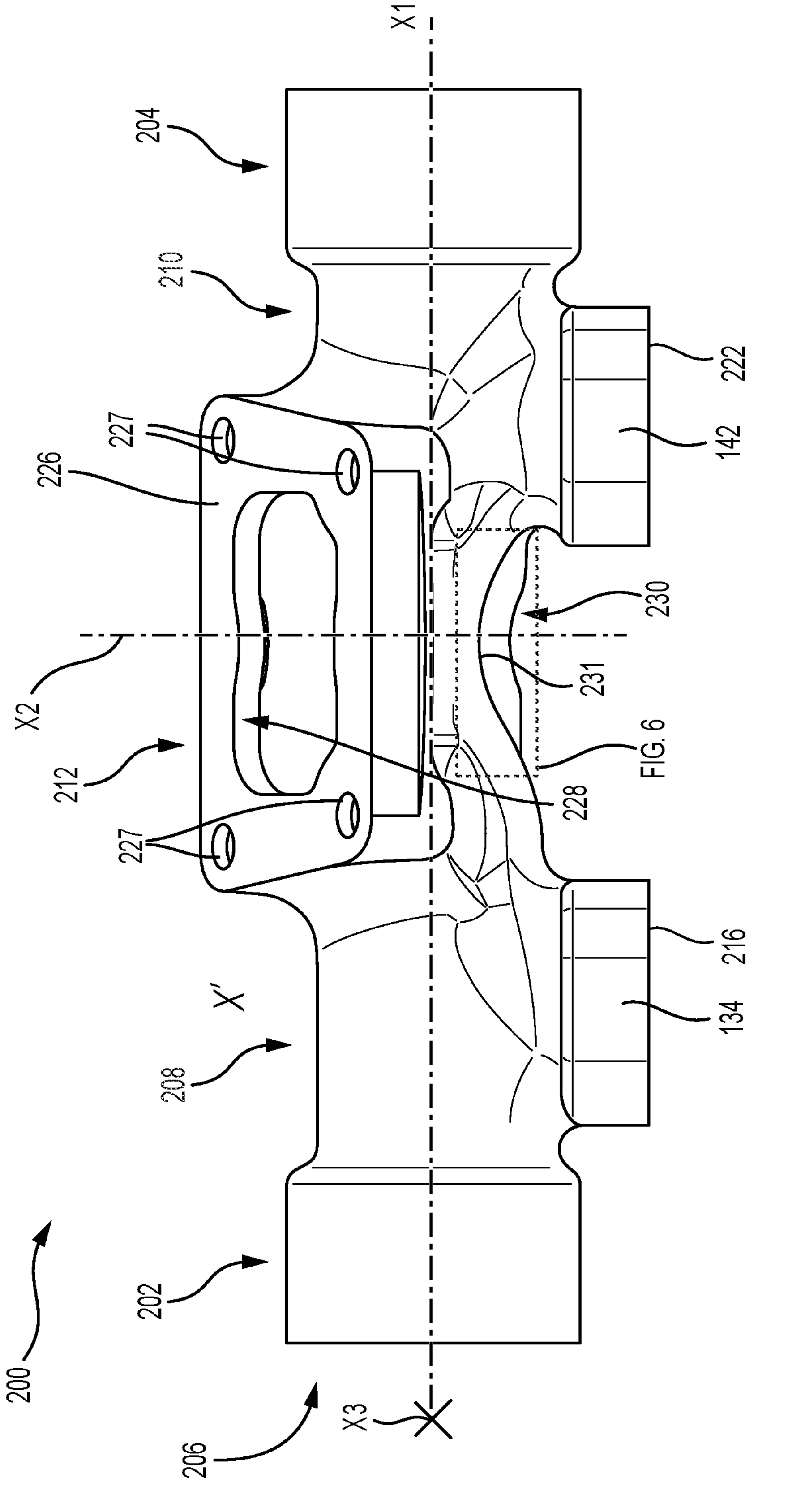
FIG. 5 is a front perspective view of the exhaust structure of FIG. 2.

As shown in FIG. 5, the body 206 further includes the outlet section 212, which is in fluid communication with each of the first inlet section 208 and the second inlet section 210 to receive exhaust gas therefrom. Exhaust gas from both the first inlet section 208 and the second inlet section 210 exit the exhaust structure 200 through the outlet section 212. Specifically, the outlet section 212 is arranged to receive exhaust gas from the first inlet section 208 and the second inlet section 210 and direct the exhaust gas towards the turbocharger 116 (see FIG. 3).

The outlet section 212 includes a lower surface 231 that may be curved. The outlet section 212 further includes a flange 226 positioned at or proximate an upper surface of the exhaust structure 200 opposite the lower surface 231. The turbocharger 116 is removably connected or secured to the exhaust structure 200 at the flange 226 of the outlet section 212. The outlet section 212 defines an opening 228 through the flange 226 through which exhaust gas from both the first inlet section 208 and the second inlet section 210 exit the exhaust structure 200. It should be noted that the outlet section 212 defines a single wide-opening 228 for exhaust gas to exit through the flange 226, the opening 228 being free of a dividing wall. The flange 226 includes a number of holes 227 for receiving fasteners (not shown), such as bolts, to secure the exhaust structure 200 with the turbocharger 116.

Further, the body 206 includes a rib 230 extending along (e.g., generally parallel to) the longitudinal axis X1 on an outer surface of the body 206. The rib 230 also extends along the vertical axis X2 and the lateral axis X3, the rib 230 being shaped and otherwise configured to convert vertical forces (e.g., generally along vertical axis X2) to lateral forces (e.g., along longitudinal axis X1).

The rib 230 is disposed on the lower surface 231 of the outlet section 212 below the flange 226 of the outlet section 212. Specifically, the rib 230 may extend from and protrude beyond the lower surface 231. The rib 230 extends between and connects the first exhaust inlet port 216 and the second exhaust inlet port 222.

Figure 6:
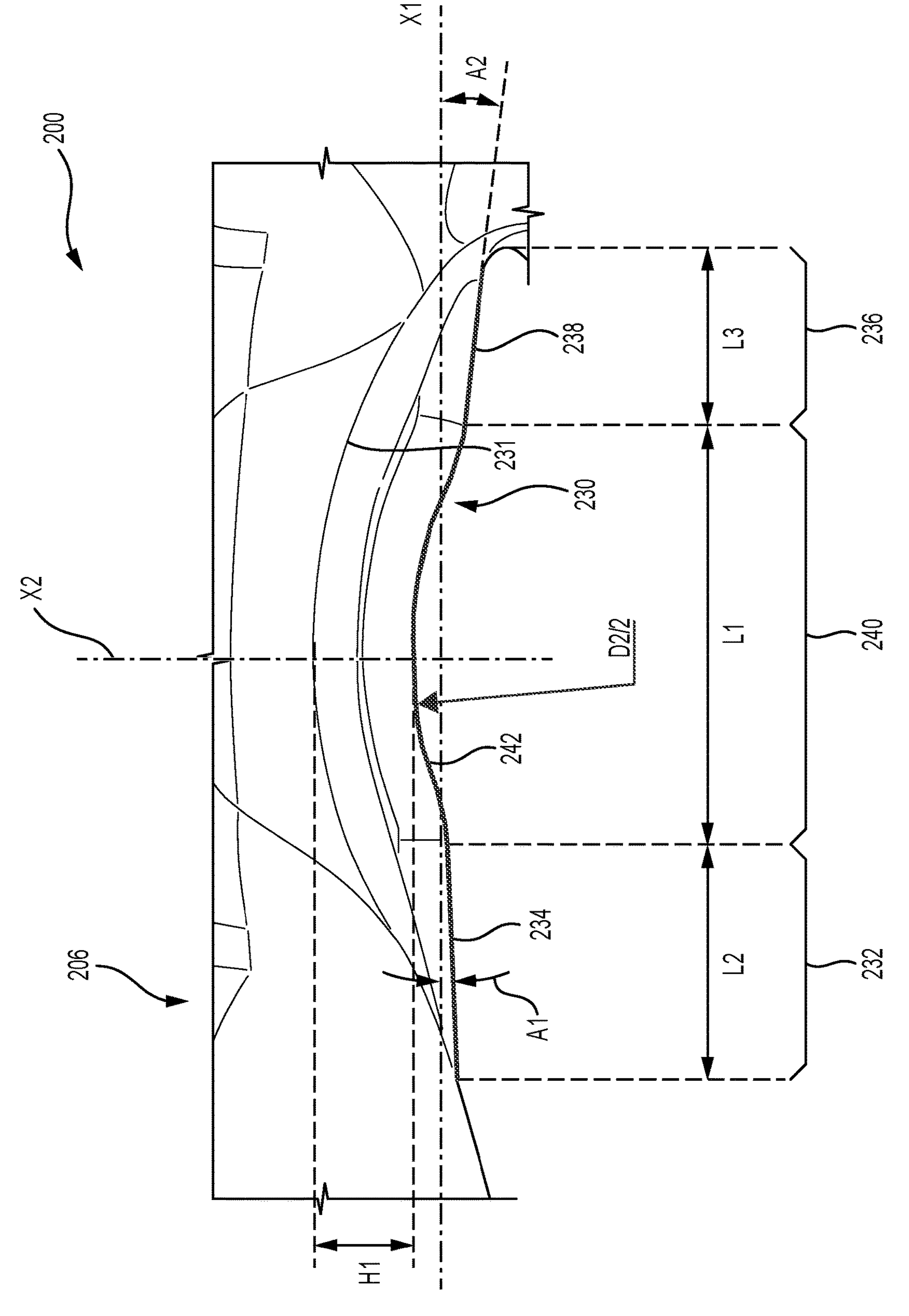
FIG. 6 is a front perspective view of a rib of the exhaust structure of FIG. 2.

As shown in FIG. 6, the rib 230 includes a first section 232 having a first inclined surface 234. The first inclined surface 234 may be a generally linear surface. In particular, the inclined surface 234 may be a planar surface. The rib 230 also includes a second section 236 spaced from the first section 232 and having a second inclined surface 238. The second inclined surface 238 may be a generally linear surface. The second inclined surface 238 may be a planar surface. The first inclined surface 234 and the second inclined surface 238 are inclined to the longitudinal axis X1 by angles A1 and A2, respectively. Angles A1 and A2 may be between about 2 degrees and about 8 degrees. In some examples, the angles A1, A2 may have different values. In other examples, the angles A1, A2 may have the same value or substantially the same value.

The rib 230 further includes a third section 240 disposed between the first section 232 and the second section 236. The third section 240 has a curved surface 242. Further, the curved surface 242 defines a rib diameter D2. The rib diameter D2 may correspond to a value that is twice the radius of curvature of curved surface 242, the radius of curvature being represented by D2/2 in FIG. 6. In some aspects, rib diameter D2 may be between 30% and 70% of the standard diameter D1 (FIGS. 2 and 5). Stated differently, the radius of curvature of surface 242 may be between 30% and 70% of the radial distance at the standard diameter D1. While the curved surface may have a constant curvature in the third section 240, the radius of curvature may change at outer lateral portions of the third section 240.

Furthermore, the curved surface 242 defines a length L1 along the longitudinal axis X1. In some examples, the length L1 is between 40% and 60% of the standard diameter D1. Moreover, the rib diameter D2 of the curved surface 242 is greater than the length L1 of the curved surface 242. The first section 232 defines a length L2 along the longitudinal axis X1. The second section 236 also defines a length L3 along the longitudinal axis X1. The length L2 is lesser than the length L3. The rib 230 further defines a varying height H1 along the vertical axis X2.

In some embodiments, the curved surface 242 has a constant or approximately constant curvature (e.g., as measured by diameter D2) along the entire length of surface 242. In other embodiments, the curvature may change (e.g., when the surface 242 is not symmetrical). In embodiments where the curvature of the curved surface 242 is not constant, the value of the rib diameter D2 corresponds to the rib diameter that best fits the curvature of surface 242. In the example of FIG. 6, the curvature that best fits surface 242 may be the curvature at the center of surface 242, at or near the location where axis X2 intersects surface 242.

Figure 7:
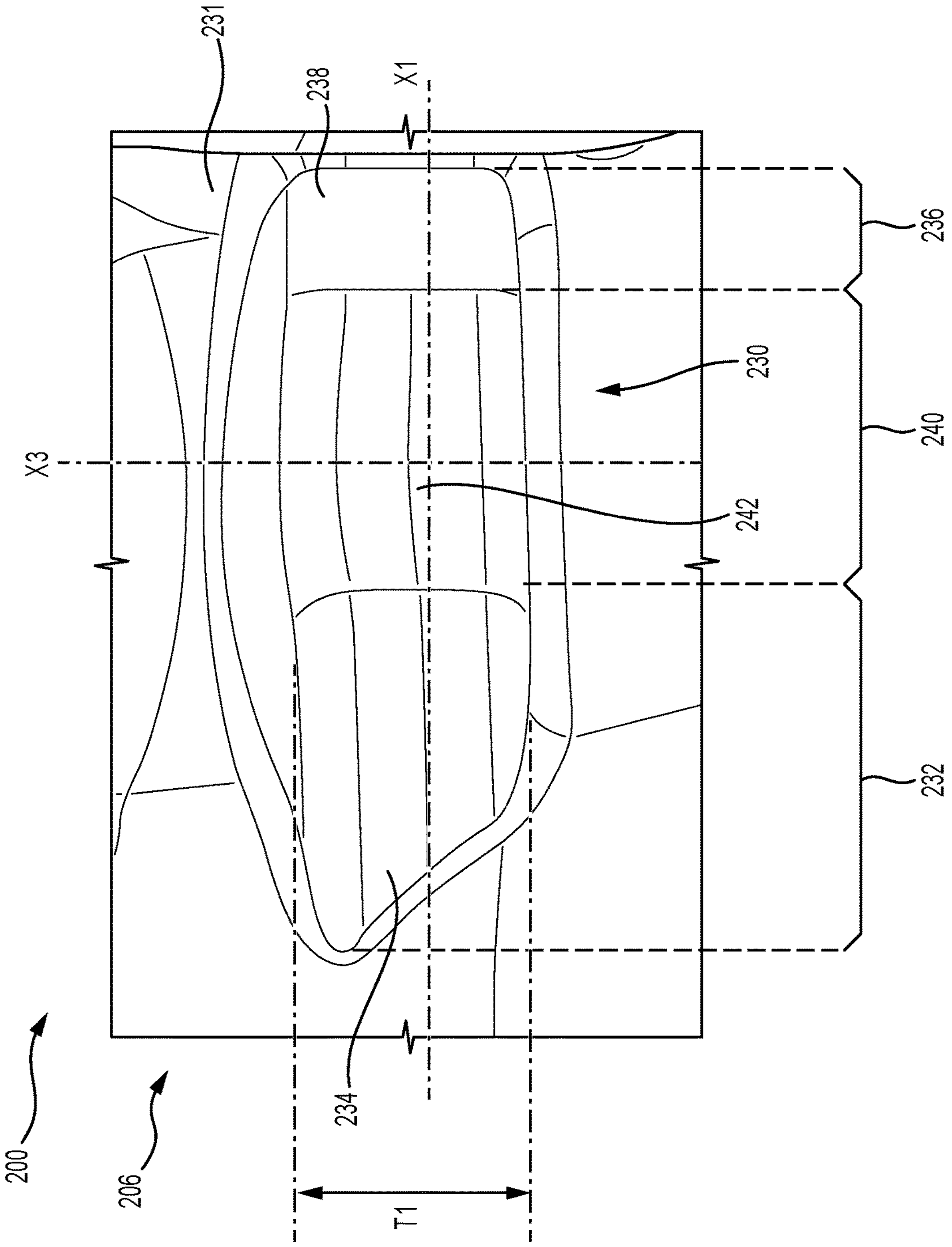
FIG. 7 is a bottom perspective view of the rib of FIG. 6.

FIG. 7 illustrates a bottom perspective view of a portion of the exhaust structure 200. As shown in FIG. 7, the rib 230 defines a thickness T1 along the lateral axis X3. The thickness T1 of the rib 230 may be uniform (e.g., constant) or approximately uniform along each of the first, second, and third sections 232, 236, 240. For example, the thickness T1 may be constant or approximately constant along an entirety of sections 236 and 240, and along a portion of section 232. If desired, thickness T1 may be constant or approximately constant along the entirety of sections 232, 236, and 240.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the exhaust structure 200 for the exhaust manifold 114. The exhaust structure 200 includes the rib 230. The rib 230 described herein may improve a thermal as well as mechanical performance of the exhaust manifold 114. Specifically, the loads, forces, and/or vibrations acting of the exhaust structure 200 along the vertically downward direction VD (see FIG. 3) may be transferred by the rib 230 along a horizontal direction HD (shown in FIG. 3). For example, forces acting on the exhaust structure 200 in the vertically downward direction VD may be transferred to the horizontal direction HD and converted to tensional forces. Such tensional forces may then be effectively managed by the bolted connections on the exhaust manifold 114, which may reduce a susceptibility of weakening of one or more portions of the exhaust structure 200 or the exhaust manifold 114.

The rib 230 may reduce likelihood of failure of or damage to the exhaust structure 200, thereby improving durability of the exhaust manifold 114. For example, the structure of the curved surface 242 may transfer forces to inclined surfaces 234 and 238, converting force and reducing the occurrence of wear in the region of sections 232, 240, and 236 of the exhaust structure 200. Further, the rib 230 may also reduce the susceptibility of the exhaust structure 200 or the exhaust manifold 114 to failure or damage.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

The general description and the detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "generally," and "approximately" are used to indicate a possible variation of ±10% in the stated value or characteristic.

What is claimed is:

1. An exhaust structure for an exhaust manifold associated with an engine, the exhaust manifold extending along a longitudinal axis, the exhaust structure comprising:

a body including:

a first inlet section of the exhaust structure, wherein the first inlet section is configured to be in fluid communication with a first set of cylinders of the engine to receive exhaust gas therefrom;

a second inlet section of the exhaust structure, wherein the second inlet section is configured to be in fluid communication with a second set of cylinders of the engine to receive exhaust gas therefrom;

an outlet section disposed in fluid communication with each of the first inlet section and the second inlet section to receive exhaust gas, wherein exhaust gas from the first inlet section and the second inlet section exit the exhaust structure through the outlet section, and wherein the outlet section includes a flange; and a rib extending generally along the longitudinal axis and disposed on a surface of the outlet section, wherein the rib includes:

a first section having a first inclined surface;

a second section spaced from the first section and having a second inclined surface, wherein at least one of the first inclined surface or the second inclined surface is a generally flat surface; and a third section disposed between the first section and the second section, the third section having a curved surface, wherein the curved surface is a concave surface that is directly connected to each of the first inclined surface and the second inclined surface, thereby connecting the first inclined surface to the second inclined surface.

2. The exhaust structure of claim 1, wherein the exhaust structure defines a standard diameter and the curved surface defines a rib diameter that is between 30% to 70% of the standard diameter.

3. The exhaust structure of claim 2, wherein the rib diameter of the curved surface is greater than a length of the curved surface.

4. The exhaust structure of claim 1, wherein each of the first inclined surface and the second inclined surface is inclined to the longitudinal axis by an angle between 2 degrees and 8 degrees.

5. The exhaust structure of claim 1, wherein the exhaust structure defines a standard diameter and the curved surface defines a length along the longitudinal axis, and wherein the length is between 40% to 60% of the standard diameter.

6. The exhaust structure of claim 1, wherein the exhaust structure defines:

a first inlet flow passage along the longitudinal axis;

a first exhaust inlet port disposed at a first angle to the longitudinal axis, wherein the first inlet section is arranged to receive exhaust gas via each of the first inlet flow passage and the first exhaust inlet port;

a second inlet flow passage along the longitudinal axis; and a second exhaust inlet port disposed at a second angle to the longitudinal axis, wherein the second inlet section is arranged to receive exhaust gas via each of the second inlet flow passage and the second exhaust inlet port.

7. The exhaust structure of claim 6, wherein the rib extends between and connects the first exhaust inlet port and the second exhaust inlet port.

8. An exhaust manifold associated with an engine, the exhaust manifold extending along a longitudinal axis, the exhaust manifold comprising:

an exhaust structure including:

a body including:

a first inlet section configured to be in fluid communication with a first set of cylinders of the engine to receive exhaust gas therefrom;

a second inlet section configured to be in fluid communication with a second set of cylinders of the engine to receive exhaust gas therefrom;

an outlet section disposed between the first inlet section and the second inlet section;

a flange in the outlet section; and a rib disposed on an outer surface of the outlet section, the rib including:

a first inclined surface;

a second inclined surface; and a curved surface extending between the first inclined surface and the second inclined surface, wherein the curved surface is directly connected to each of the first inclined surface and the second inclined surface, thereby connecting the first inclined surface to the second inclined surface;

a first manifold portion extending along the longitudinal axis and arranged to receive exhaust gas from at least one cylinder of the first set of cylinders; and a second manifold portion extending along the longitudinal axis and arranged to receive exhaust gas from at least one cylinder of the second set of cylinders.

9. The exhaust manifold of claim 8, wherein each of the first inclined surface and the second inclined surface is inclined to the longitudinal axis by an angle between 2 degrees and 8 degrees.

10. The exhaust manifold of claim 8, wherein the exhaust structure defines a standard diameter and the curved surface defines a length along the longitudinal axis, and wherein the length is between 40% to 60% of the standard diameter.

11. The exhaust manifold of claim 8, wherein the exhaust structure defines a standard diameter and the curved surface defines a rib diameter that is between 30% to 70% of the standard diameter.

12. The exhaust manifold of claim 8, wherein the exhaust structure defines:

a first inlet flow passage extending along the longitudinal axis;

a first exhaust inlet port disposed at a first angle to the longitudinal axis, wherein the first inlet section is arranged to receive exhaust gas via each of the first inlet flow passage and the first exhaust inlet port;

a second inlet flow passage extending along the longitudinal axis; and a second exhaust inlet port disposed at a second angle to the longitudinal axis, wherein the second inlet section is arranged to receive exhaust gas via each of the second inlet flow passage and the second exhaust inlet port.

13. The exhaust manifold of claim 12, wherein the rib extends between the first exhaust inlet port and the second exhaust inlet port.

14. The exhaust manifold of claim 8, wherein the first inclined surface and the second inclined surface are planar surfaces.

15. An engine system comprising:

an engine having a first set of cylinders and a second set of cylinders;

an exhaust manifold in fluid communication with the engine, the exhaust manifold extending along a longitudinal axis, the exhaust manifold including:

an exhaust structure including:

a body including:

a first inlet section arranged at a first end of the exhaust structure, wherein the first inlet section is in fluid communication with the first set of cylinders of the engine to receive exhaust gas therefrom;

a second inlet section arranged at a second, opposite end of the exhaust structure, wherein the second inlet section is in fluid communication with the second set of cylinders of the engine to receive exhaust gas therefrom;

an outlet section disposed in fluid communication with each of the first inlet section and the second inlet section to receive exhaust gas, wherein exhaust gas from both the first inlet section and the second inlet section exit the exhaust structure through the outlet section, and wherein the outlet section includes a flange; and a rib extending along the longitudinal axis and disposed on a surface of the outlet section, wherein the rib includes:

a first section having a first inclined surface;

a second section spaced from the first section and having a second inclined surface; and a third section disposed between the first section and the second section, the third section having a curved surface including a concave surface, wherein the concave surface extends to each of the first inclined surface and the second inclined surface, thereby connecting the first inclined surface to the second inclined surface;

a first manifold portion extending along the longitudinal axis and arranged to receive exhaust gas from at least one cylinder of the first set of cylinders; and a second manifold portion extending along the longitudinal axis and arranged to receive exhaust gas from at least one cylinder of the second set of cylinders; and a turbocharger disposed in fluid communication with the exhaust structure, wherein the turbocharger is secured to the exhaust structure at the flange of the outlet section.

16. The engine system of claim 15, wherein each of the first inclined surface and the second inclined surface is inclined to the longitudinal axis by an angle between 2 degrees and 8 degrees.

17. The engine system of claim 15, wherein the exhaust structure defines a standard diameter and the curved surface defines a length along the longitudinal axis, and wherein the length is between 40% to 60% of the standard diameter.

18. The engine system of claim 17, wherein a rib diameter of the curved surface is greater than the length of the curved surface.

19. The engine system of claim 15, further including:

a first inlet flow passage that extends along the longitudinal axis;

a first exhaust inlet port disposed at a first angle to the longitudinal axis, wherein the first inlet section is arranged to receive exhaust gas via each of the first inlet flow passage and the first exhaust inlet port;

a second inlet flow passage along the longitudinal axis; and a second exhaust inlet port disposed at a second angle to the longitudinal axis, wherein the second inlet section is arranged to receive exhaust gas via each of the second inlet flow passage and the second exhaust inlet port.

20. The engine system of claim 19, wherein the rib extends between and interconnects the first exhaust inlet port and the second exhaust inlet port.

* * * * *